(12) United States Patent
Catalano et al.

(10) Patent No.: US 10,789,990 B2
(45) Date of Patent: Sep. 29, 2020

(54) VIDEO DATA LEARNING AND PREDICTION

(71) Applicant: International Business Machines Corporation, Armonk, NY (US)

(72) Inventors: Pasquale A. Catalano, Wallkill, NY (US); Andrew G. Crimmins, Montrose, NY (US); Arkadiy O. Tsfasman, Wappingers Falls, NY (US); John S. Werner, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/222,876

(22) Filed: Dec. 17, 2018

(65) Prior Publication Data
US 2020/0194035 A1    Jun. 18, 2020

(51) Int. Cl.
| | | |
|---|---|---|
| G11B 27/34 | (2006.01) | |
| G06K 9/00 | (2006.01) | |
| G10L 15/22 | (2006.01) | |
| H04N 21/8549 | (2011.01) | |
| H04N 21/472 | (2011.01) | |
| H04N 21/466 | (2011.01) | |
| H04N 21/845 | (2011.01) | |
| G10L 15/26 | (2006.01) | |

(52) U.S. Cl.
CPC .......... *G11B 27/34* (2013.01); *G06K 9/00758* (2013.01); *G06K 9/00765* (2013.01); *G10L 15/22* (2013.01); *G10L 15/265* (2013.01); *H04N 21/4667* (2013.01); *H04N 21/47217* (2013.01); *H04N 21/8455* (2013.01); *H04N 21/8549* (2013.01)

(58) Field of Classification Search
None
See application file for complete search history.

(56) References Cited

U.S. PATENT DOCUMENTS 7,181,757 B1    2/2007  Kim et al.
9,456,174 B2    9/2016  Boyle et al.
(Continued)

OTHER PUBLICATIONS

Clevinger, D., "IBM Watson Media Video + Data," IBM, 2017, pp. 1-29.
(Continued)

*Primary Examiner* — Eileen M Adams
(74) *Attorney, Agent, or Firm* — Zilka-Kotab, P.C.

(57) ABSTRACT

A computer-implemented method for locating content corresponding to a recap segment includes determining whether a recap segment is present in video data corresponding to a video series. In response to determining that the recap segment is present, the method includes dividing the recap segment into clips corresponding to individual scenes in one or more previous episodes of the video series and, for each clip, comparing the clip to one or more of the episodes in the video series for determining a location of the clip in one of the episodes. The method also includes determining whether the clip is part of a larger scene in the episode corresponding thereto and determining a starting and ending time of the larger scene within the episode. The method includes storing the starting and ending time of the larger scene in correlation with the clip.

16 Claims, 5 Drawing Sheets

(56) References Cited

U.S. PATENT DOCUMENTS

| | | | | |
|---|---|---|---|---|
| 2007/0127773 | A1* | 6/2007 | Ogawa | G06F 16/7837 |
| | | | | 382/103 |
| 2014/0173649 | A1* | 6/2014 | Medapati | H04N 5/783 |
| | | | | 725/25 |
| 2014/0282673 | A1* | 9/2014 | Neumeier | H04N 21/44008 |
| | | | | 725/19 |
| 2017/0255827 | A1 | 9/2017 | Chang et al. | |
| 2019/0205652 | A1* | 7/2019 | Ray | G06K 9/00724 |

OTHER PUBLICATIONS

Xu et al., "Heterogeneous Knowledge Transfer in Video Emotion Recognition, Attribution and Summarization," arXiv, Feb. 2018, 16 pages, retrieved from https://arxiv.org/pdf/1511.04798.pdf.

Anonymous, "Cognitive Feedback for Presentation," IP.com Prior Art Database, Technical Disclosure No. IPCOM000244179D, Nov. 20, 2015, 4 pages.

Anonymous, "Cognitive Video Playback Monitoring across Mobile Devices," IP.com Prior Art Database, Technical Disclosure No. IPCOM000248915D, Jan. 22, 2017, 6 pages.

Anonymous, "Automatic video generation based on machine learning," IP.com Prior Art Database, Technical Disclosure No. IPCOM000253268D, Mar. 19, 2018, 5 pages.

TV Tropes, "Previously on," 2018, 5 pages, retrieved on Dec. 17, 2018, from http://tvtropes.org/pmwiki/pmwiki.php/Main/PreviouslyOn.

TV Tropes, "Montages," 2018, 6 pages, retrieved on Dec. 17, 2018, from https://tvtropes.org/pmwiki/pmwiki.php/Main/Montages.

TV Tropes, "Story Arc," 2018, 4 pages, retrieved on Dec. 17, 2018, from https://tvtropes.org/pmwiki/pmwiki.php/Main/StoryArc.

TV Tropes, "Spoiler Opening," 2018, 3 pages, retrieved on Dec. 17, 2018, from https://tvtropes.org/pmwiki/pmwiki.php/Main/SpoilerOpening.

IBM, "Visual Recognition," IBM Watson, 2018, 6 pages, retrieved from https://www.ibm.com/watson/services/visual-recognition/.

IBM, "Natural Language Understanding," 2018, 11 pages, retrieved from https://www.ibm.com/watson/services/natural-language-understanding/.

* cited by examiner

| Clip # (c) | Location in recap segment (t) (seconds) | Corresponding Episode | Location in Episode ($t_{start}$ - $t_{end}$) |
|---|---|---|---|
| 1 | 0 | S2E3 | (13:32 - 17:12) |
| 2 | 30 | S2E6 | (2:48 - 5:23) |
| 3 | 45 | S4E1 | (10:11 - 14:34) |
| 4 | 62 | S6E7 | (21:17 - 23:36) |
| ... | ... | ... | ... |

VIDEO DATA LEARNING AND PREDICTION

BACKGROUND

The present invention relates to generating video recap content, and more specifically, this invention relates to cognitive video recap generation.

Episodes in an episodic video series typically have an introductory video segment that recaps important scenes from previous episodes. A recap segment typically includes a clip montage at the beginning of an episode with a voiceover and/or text which is a variation of "Previously on," "Last time on," etc. The recap segment serves to remind a viewer of past content, set the mood for the episode, provide marketing, etc. Different viewers may prefer to see more or less content and/or different content depending on how recently the previous installments were viewed, the user's memory, personal preferences, etc.

SUMMARY

A computer-implemented method for locating content corresponding to a recap segment, according to one embodiment, includes determining whether a recap segment is present in video data corresponding to a video series. In response to determining that the recap segment is present, the method includes dividing the recap segment into clips corresponding to individual scenes in one or more previous episodes of the video series and, for each clip, comparing the clip to one or more of the episodes in the video series for determining a location of the clip in one of the episodes. The method also includes determining whether the clip is part of a larger scene in the episode corresponding thereto and determining a starting and ending time of the larger scene within the episode. The method includes storing the starting and ending time of the larger scene in correlation with the clip.

A computer-implemented method, according to one embodiment, includes determining whether a recap segment is present in video data corresponding to a video series. In response to determining that the recap segment is present, the method includes identifying clips in the recap segment and outputting an option to alter output of one of the clips of the recap segment as the clip is output. In response to receiving selection of the option to alter the output of the clip, the method includes altering the clip according to the selection. In response to not receiving selection of the option to alter the output of the clip, the method includes outputting the unaltered clip.

A computer program product, according to one embodiment, is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for cognitive video recapping. For example, the present disclosure describes a method to learn what the viewer needs to be reminded of (in a recap segment). This is done, in one approach, by first identifying the content within the recap segment in relationship to the corpus of work. Then the user is allowed to view more of the content with the recap segment (e.g., show the entire scene instead of just the 3-5 second video clip). In additional embodiments, machine learning is used to determine how far in the past to select content for user review, and/or predict which clips in future recap segments should be expanded or omitted for this specific viewer.

In one general embodiment, a computer-implemented method for locating content corresponding to a recap segment includes determining whether a recap segment is present in video data corresponding to a video series. In response to determining that the recap segment is present, the method includes dividing the recap segment into clips corresponding to individual scenes in one or more previous episodes of the video series and, for each clip, comparing the clip to one or more of the episodes in the video series for determining a location of the clip in one of the episodes. The method also includes determining whether the clip is part of a larger scene in the episode corresponding thereto and determining a starting and ending time of the larger scene within the episode. The method includes storing the starting and ending time of the larger scene in correlation with the clip.

In another general embodiment, a computer-implemented method includes determining whether a recap segment is present in video data corresponding to a video series. In response to determining that the recap segment is present, the method includes identifying clips in the recap segment and outputting an option to alter output of one of the clips of the recap segment as the clip is output. In response to receiving selection of the option to alter the output of the clip, the method includes altering the clip according to the selection. In response to not receiving selection of the option to alter the output of the clip, the method includes outputting the unaltered clip.

In another general embodiment, a computer program product is configured to perform the foregoing method.

Figure 1:
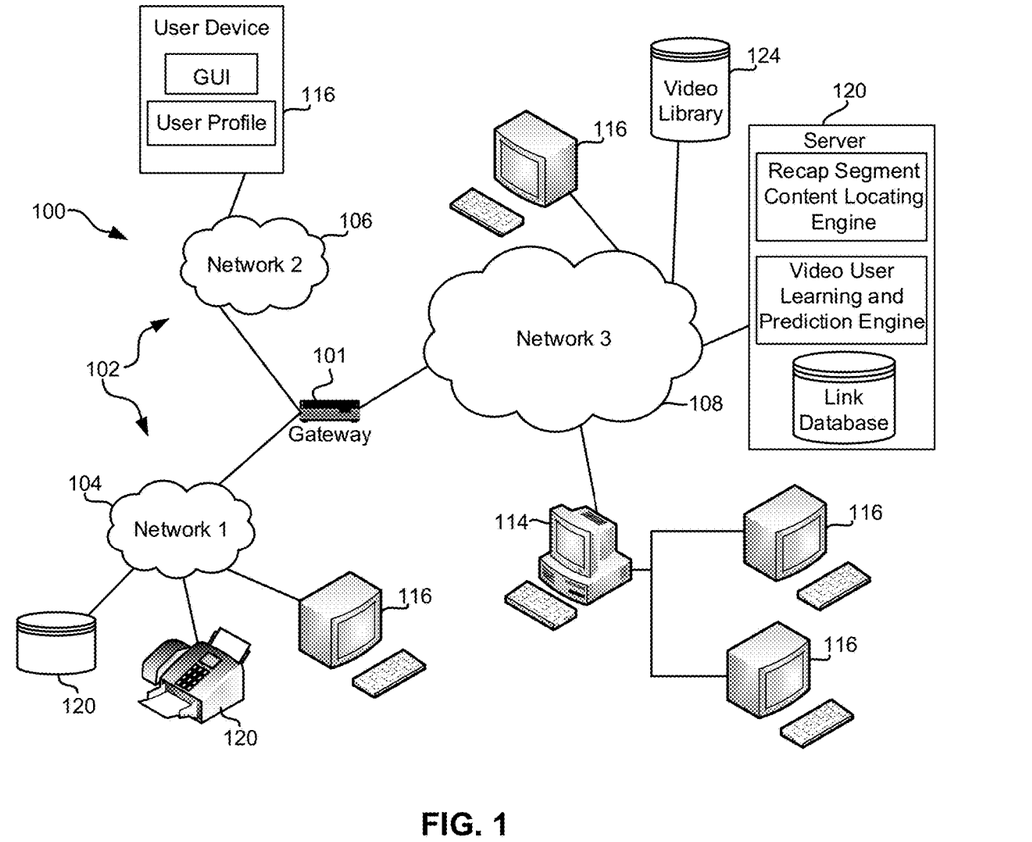
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116.

User devices 116 may also be connected directly through one of the networks 104, 106, 108. Such user devices 116 may include a desktop computer, a lap-top computer, a hand-held computer, a printer or any other type of logic. It should be noted that a user device 116 may also be directly coupled to any of the networks, in one embodiment.

In one embodiment, the user device 116 may be any device configured for streaming video content. Such devices may include a set top box, a set top unit, a smart television (TV), a tablet, a mobile device, a desktop computer, a lap-top computer, a hand-held computer, etc. The user device 116 may include a graphical user interface (GUI). The user device 116 may comprise a user profile which stores information regarding how the user interacts with the user device 116, how the user interacts with the GUI, the user's video viewing history, etc.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

In one embodiment, the peripherals 120 may include a server. The server may include a recap segment content locating engine which is configured to identify the relationship between clips in the video recap segment and video data corresponding to a video series. In a preferred approach, the recap content locating engine identifies if a recap segment exists within an episode. The recap content locating engine may then identify the location of clips within the recap segment. The recap content locating engine may then identify corresponding locations in episodes as described below in reference to FIGS. 3-5. In one embodiment, the recap segment content locating engine activates when new video content is uploaded to a server, a user device, a video library, etc.

In another embodiment, the server may include a video user learning and prediction engine which is configured to perform at least some of the operations of the method as described below in FIGS. 3-5. In a preferred approach, the video user learning and prediction engine predicts whether to alter the output of clips within a recap segment based on the user's video viewing history, the user's past selections when offered an option to alter the clip, a threshold amount of time has passed since the user has watched the previous episode corresponding to the clip in the video recap, other users' data (e.g. social data), etc.

In yet another embodiment, the server may additionally include a link database which is configured to provide and/or store linking points between clips in a recap segment and corresponding location(s) in video data. The link database may enable access to other objects in other databases. The link database may be configured to store any additional tag information associated with clips which comprise a recap segment.

In one approach, an architecture 100 may include a video library 124. The video library 124 may be a source of video content for streaming to a user device 116. The video library 124 may be configured to store, index, search, retrieve, stream, etc. video data as would be understood by one having ordinary skill in the art.

In another approach, the video library 124 may be on a server in the peripherals 120. The video library 124 may be downloadable via a cloud-based service in another approach. In yet another approach, the video library 124 may be stored locally on a user device 116.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
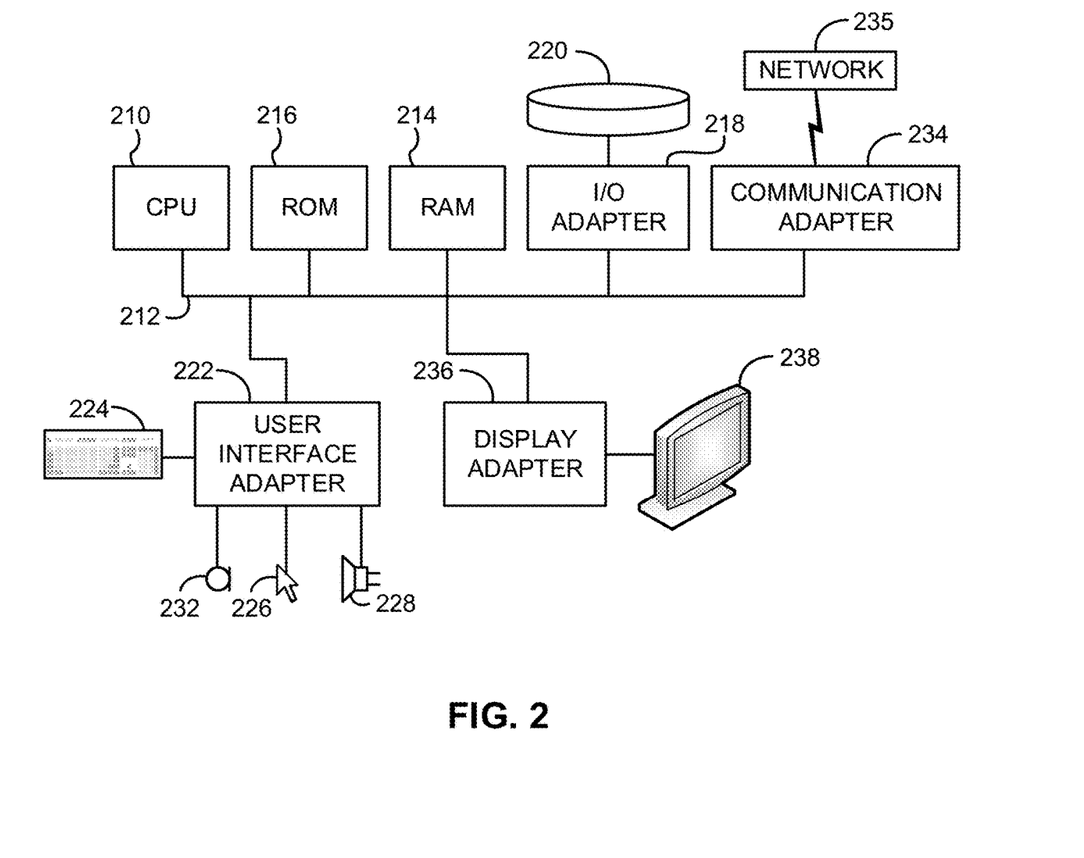
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

In order to provide a context and aid the reader in understanding the various embodiments of the invention, many of the embodiments are described using the following exemplary illustrative terms. The term "clip" is used to refer to a portion of a recap segment. A recap segment typically comprises various clips. The various clips may correspond to larger scenes of video data which include the clips. An episode of video data may comprise the larger scenes. A video series may comprise a plurality of episodes of video data.

Some of the inventive embodiments described herein relate to a method of using machine learning and/or cognitive processing to predict which parts of a video recap segment, if any, should be altered for a user. For example, the recap segment may be divided into individual clips which correspond to larger scenes within previous episodes. In response to identifying the relationship between the clip and the larger scene, further in reference to the corpus of the work (e.g. an episodic series), the method may predict whether to output and/or present the user with an option to view the larger scene and/or otherwise alter the output of the clip instead of viewing the relatively shorter video clip as it typically outputs in the recap segment.

Figure 3:
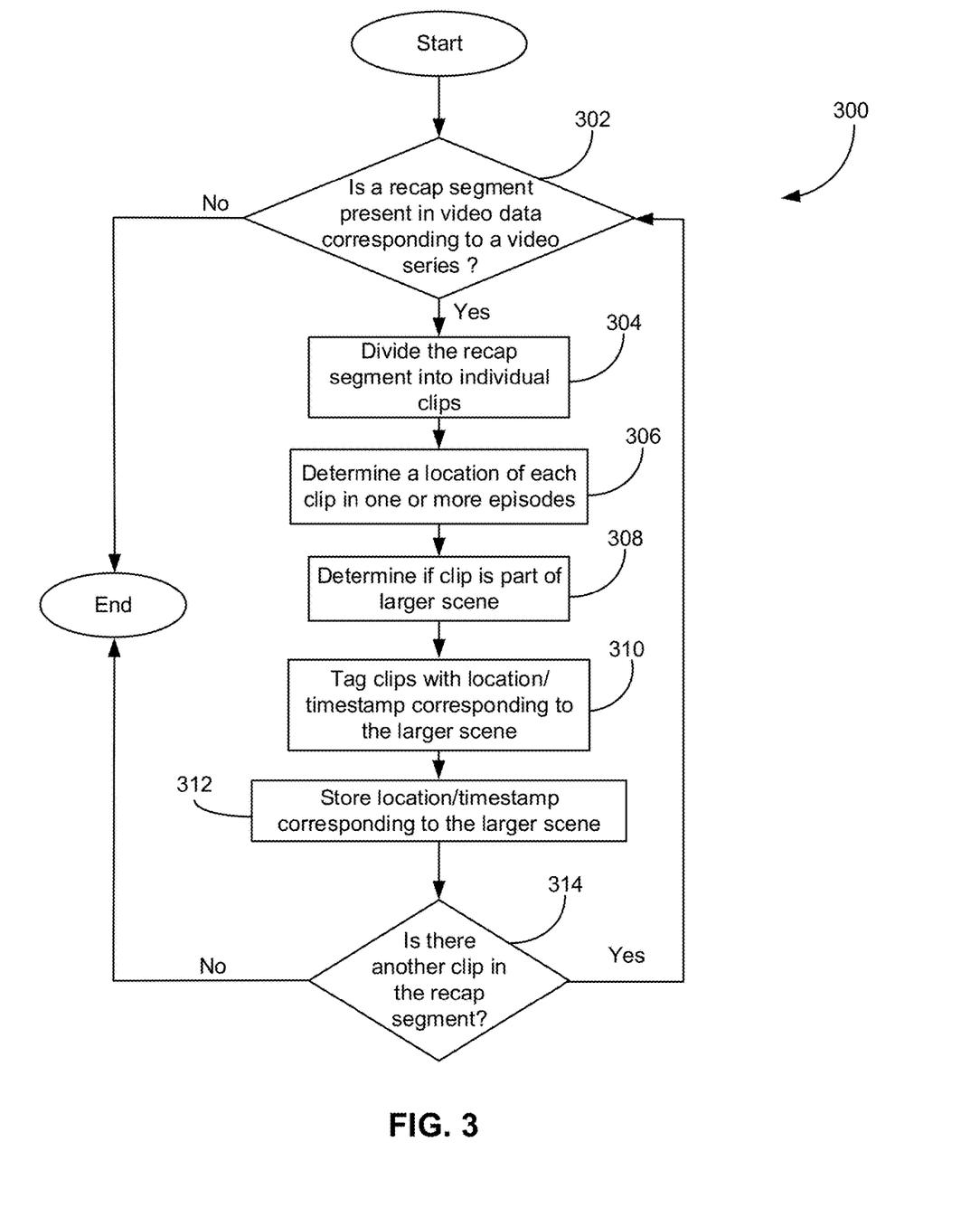
FIG. 3 is a flowchart of a method according to one embodiment.

Now referring to FIG. 3, a flowchart of a method 300 is shown according to one embodiment. The method 300 may be performed in accordance with the present invention in any of the environments depicted in FIGS. 1-2 and 4-5, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may comprise decision block 302, which includes an operation for determining whether a recap segment is present in video data corresponding to a video series. In one approach, video content to be analyzed is uploaded into a recap segment content locating engine. Video content which is uploaded into a recap segment content locating engine may be video content which is new to a server, a video library, a user device, etc. In one approach, the video data may be an episode of the video series, one or more episodes of the video series, the entire video series, etc.

In one embodiment, the video content is analyzed to determine if a recap segment exists for the current episode. Illustrative techniques for analyzing the video content to determine if a recap segment exists for the current episode include video, audio, image, textual, etc. data processing to determine whether the words "Previously On," "Last Time On," and/or any other words indicative of a recap segment appear in the video data. The video data may be analyzed to determine if a recap segment exists using any technique known in the art. In one approach, techniques known in the art may be used to search for a quick succession of short clips near the start time of the video data to determine if a recap segment exists for the video data.

If yes, the method 300 continues to operation 304. If no, the method ends.

Operation 304 includes, in response to determining whether a recap segment is present, dividing the recap segment into clips corresponding to individual scenes in one or more previous episodes of the video series. Dividing the recap segment into individual clips may be done by detecting scene transitions, audio queues, starting and ending points of scenes, etc. Dividing the recap segment into individual clips may be done via any technique known in the art.

Operation 306 includes comparing the clip to one or more of the episodes in the video series for determining a location of the clip in one of the episodes. The location of the clip in one of the episodes may correspond to the episode from which the segment was extracted to create the recap segment. Any technique known in the art may be used to determine the starting time and the ending time of the location of the clip in one of the episodes.

In a preferred approach, the clips are compared to episodes sequentially starting with the most recent episode. The most recent episode may be the most recent relative to the episode containing the recap segment. For example, the method may compare a clip from the recap of episode 4 of season 7 of a video series to episode 3, then episode 2, and episode 1 of season 7 first rather than beginning the comparison of episode 4 of season 7 to episodes of season 1 of the video series.

In one approach, comparing the clip to the one or more episodes includes analyzing image data of the clip and the one or more episodes. Analyzing image data may include using visual recognition techniques. Visual recognition analysis may be performed using Google Image Recognition, Amazon Rekognition, Clarifai, Ditto Labs, Brandwatch Image Insights, GumGum, LogoGrab, IBM Image Detection, or any visual recognition analysis software known in the art. In an exemplary embodiment of method 300, the visual recognition software for performing the visual recognition analysis is Watson™ Visual Recognition Application Programming Interface (API) (International Business Machines Corporation (IBM), 1 New Orchard Road, Armonk, N.Y. 10504, United States). Any known technique in the art for analyzing image data may be used.

In another approach, comparing the clip to the one or more episodes includes analyzing audio data of the clip and the one or more episodes. Audio analysis may be performed using Audacity, Seewave, TuneR, Soundecology, Ineq, Pachyderm, Raven Pro, Avisoft SASLab Pro, Adobe Audition or any audio data analysis software known in the art. In an exemplary embodiment of method 300, the audio data analysis software for performing the audio data analysis is Watson Natural Language Understanding (International Business Machines Corporation (IBM), 1 New Orchard Road, Armonk, N.Y. 10504, United States). Any known technique in the art for analyzing audio data may be used.

In yet another approach, the comparing the clip to the one or more episodes includes analyzing speech-to-text data of the clip and the one or more episodes. Speech-to-text analysis may be performed using NextGen Mobile Solutions, Castel Detect LIVE, Yactraq, Braina, Sonix, Speech-Texter Apple Dictation, Windows Speech Recognition, Google Docs Voice Typing, Dragon NaturallySpeaking, Siri, Cortana, Google Now, Speech Recogniser, ListNote, Gboard, or any speech-to-text analysis software known in the art. In an exemplary embodiment of method 300, the audio data analysis software for performing the audio data analysis is Watson Speech to Text (International Business Machines Corporation (IBM), 1 New Orchard Road, Armonk, N.Y. 10504, United States). Any known technique in the art for analyzing speech-to-text data may be used. Additional techniques may include closed captioning processing, textual processing, natural language processing, etc.

In more approaches, any combination of the foregoing image, audio, speech-to-text, etc. data analysis techniques may be used to compare the clip to the one or more episodes.

In one embodiment, the techniques as described above may be used in operation 304 to divide the recap segment into clips corresponding to individual scenes in one or more previous episodes of the video series.

Operation 308 includes determining whether the clip is part of a larger scene in a corresponding episode. The clip may be compared to the context of the original location (as determined in operation 306) to determine if the clip is part of a larger scene. Any of the techniques as described above for comparing the clip to the one or more episodes may be used to determine whether the clip is part of a larger scene in the episode from which the clip originates. Known techniques may include detecting scene transitions, audio queues, starting and ending times of scenes, etc. Any technique known in the art may be used to determine the starting time and ending time of the larger scene from which the clip was extracted to make the recap segment.

Operation 310 includes tagging the clip with the location of the clip within the episode from which the clip was extracted to make the video recap. Tagging the clip may include the starting time, the ending time, or any other timestamp data associated with the larger scene in the episode and/or the episode itself. Tagging the clip may include any other relevant metadata associated with the clip. Metadata may include descriptive metadata, structural metadata, administrative metadata, reference metadata, statistical metadata, or any other type of metadata known in the art.

Operation 312 includes storing the starting and ending time of the larger scene in correlation with the clip. Any metadata as mentioned above may be stored in correlation with the clip. The starting and ending time of the larger scene in correlation with the clip and/or any other relevant information may be stored in any format known in the art. In a preferred approach, the starting and ending time of the larger scene in correlation with the clip and/or any other relevant information may be stored in a table as described further below in reference to FIG. 4.

Method 300 comprises decision block 314 which includes an operation to determine if there is another clip in the recap segment. If yes, method 300 loops back to decision block 302 and iterates the process for each clip in the recap segment. If no, method 300 ends when there are no more clips left in the recap segment.

Figure 4:
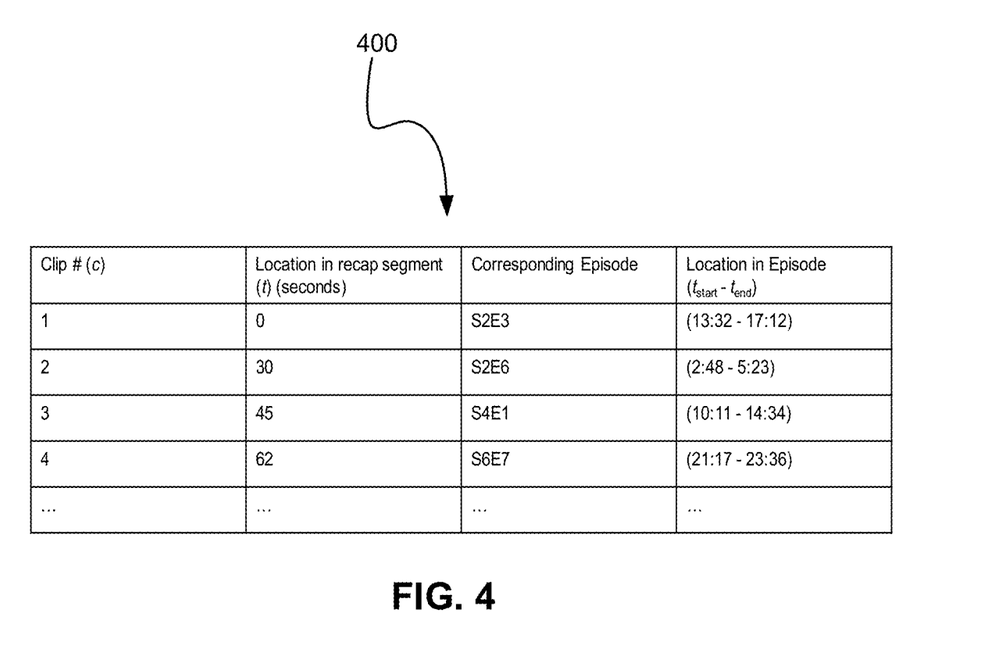
FIG. 4 is an exemplary table as described in reference to FIG. 3.

Referring now to FIG. 4, a portion of an exemplary table 400 generated by operation 312 of method 300 is illustrated. As an option, the present table may be implemented in conjunction with features from any other embodiment listed herein, such as those described with reference to the other FIGS. Of course, however, such a table 400 and others presented herein may be used in various applications and/or in permutations which may or may not be specifically described in the illustrative embodiments listed herein. The table 400 presented herein may be used in any desired environment.

In one embodiment, for each clip c, there may be a corresponding location in the recap segment denoted by a time t in seconds. Alternatively, or in addition to, each clip c may be stored with a corresponding location in the recap segment denoted by $(t_{start}, t_{end})$. Each c may be stored with a corresponding episode and the clip's location in the episode denoted by a time t in seconds and/or $(t_{start}, t_{end})$. Additional information including timestamp metadata, location metadata, user metadata, etc. may be stored in the table in correlation to the clip(s) in the recap segment.

Figure 5:
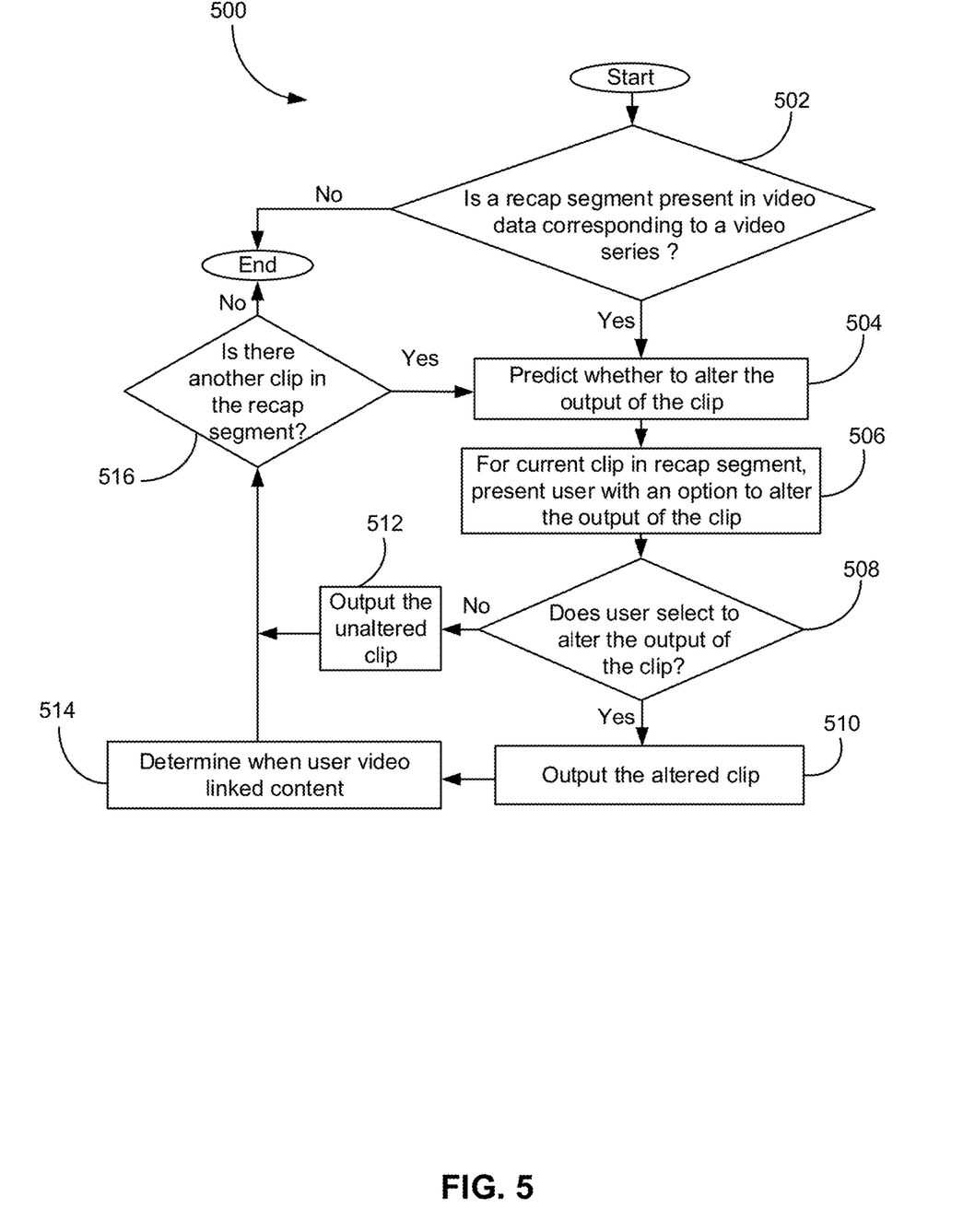
FIG. 5 is a flowchart of a method according to one embodiment.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may comprise decision block 502 which comprises an operation for determining whether a recap segment is present in video data a user has requested to view on their user device 116. In one approach, video content to be analyzed is uploaded into a recap segment content locating engine. The video data may be an episode of the video series. The video content may be analyzed to determine if a recap segment exists for the current episode. Illustrative techniques of analyzing video content to determine if a recap segment exists for the current episode include video, audio, image, textual, etc. data processing to determine whether the words "Previously On," "Last Time On," and/or any other words indicative of a recap segment appear in the video data. In one approach, techniques known in the art may additionally be used to search for a quick succession of short clips near the start time of the video data to determine if a recap segment exists for the video data. The video data may be analyzed to determine if a recap segment exists using any technique known in the art.

If yes, the method 500 continues to operation 504. If no, the method ends.

In one embodiment, in response to determining whether a recap segment is present, the method 500 includes identifying clips in the recap segment. The method 500 may identify the clips in the recap segment from metadata that comes in with the recap segment, from an online table, from linking points in a link database, based on tagged information, etc.

Operation 504 includes predicting whether to alter the output of the clip. In one embodiment, the method makes the prediction whether to alter the output of the clip based on a prediction algorithm. The prediction algorithm makes a prediction as to whether to alter the output of the clip based on the user's past video viewing history, the user's past selections when offered an option to expand or skip a clip, a threshold amount of time has passed since the user has watched the previous episode corresponding to the clip in the video recap, other users' data (e.g. social data), etc. A threshold amount of time between the previous episode and the current episode may be set by the prediction algorithm, the user, an average amount of time based on other user's viewing history, etc.

Operation 504 of method 500 may comprise executing a prediction algorithm for determining whether to output the portion for at least some of the clips.

In one approach, the prediction algorithm may make a prediction as to whether to alter the output of a clip based on whether the user has reviewed at least a portion of a previous episode. A user reviewing at least a portion of a previous episode may indicate that the user would have selected to alter the output of a clip corresponding to at least a portion of the previous episode. In another approach, the prediction algorithm may make a prediction as to whether to alter the output of a clip based on whether the user has rewound at least a portion of a previous episode. A user rewinding at least a portion of a previous episode may indicate that the user would have selected to alter the output of a clip corresponding to at least a portion of the previous episode.

In one embodiment, the prediction algorithm corresponds to a user profile. An individual's viewing history, prior selections, interactions with the GUI, etc. may be stored in the user profile in any form known in the art. In one approach, the data corresponding to an individual user may be stored in a table. In another embodiment, the prediction algorithm may correspond to various profiles with a plurality of users and their preferences. For example, spouses may have separate user profiles for streaming video data content separately, in addition to a joint user profile which combines each person's preferences in order to make a prediction as to whether to alter the output of a clip.

In yet another embodiment, the prediction algorithm may make a prediction as to whether to alter the output of a clip based on social data. Social data may include other users' viewing history, selections, preferences, etc. In one approach, if a threshold percentage of other users (e.g. a majority, 50% to 100%, etc.) make a certain selection, the prediction algorithm may adjust an individual user's profile accordingly.

Operation 506 includes outputting an option to alter the output of one of the clips of the recap segment as the clip is output. A decision to output the option to alter the output of one of the clips may be based on whether the prediction algorithm of operation 504 predicted that the clip should be altered. Outputting an option to alter the output of one of the clips of the recap segment may be an on-screen selectable option, an aural option presented by a virtual assistant, a combination of the foregoing techniques, or any technique for outputting an option to a user known in the art.

In one approach, a content creator may have the option to bypass one or more of the operations of method 500. For example, a content creator may be able to tag a clip or series of clips in the recap video to prevent method 500 from outputting an option to alter the output of the clip or series of clips. A content creator may wish to keep a clip or series of clips in the recap segment for artistic reasons, to set a tone for the episode, to allude to future scenes, etc.

Decision block 508 includes an operation determining whether the user selects to alter the output of the clip. Altering the output of the clip may include expanding the clip to show the larger scene corresponding to the clip, expanding the clip to show the entire episode, expanding the clip to show the larger scene corresponding to the clip in addition to video data surrounding the larger scene, omitting the clip from the recap segment, skipping the clip, omitting the larger scene, etc. In one embodiment, the option to alter the output of the clip includes outputting at least a portion of a larger scene corresponding to the clip, the larger scene being from an episode of the video series.

Operation 510 includes, in response to receiving a selection of the option to alter the output of the clip, outputting the altered the clip according to the selection. In one approach, the recap segment is paused and the series, episode, scene, clip, etc. corresponding to the selection is displayed.

Operation 512 includes, in response to not receiving a selection of the option to alter the output of the clip, outputting the unaltered clip. In another approach, in response to not receiving selection of the option to alter the output of the clip, method 500 may output the altered clip according to the prediction algorithm.

In one embodiment, operation 514 of the method 500 determines when the user video linked content during the selection. Determining when a user video linked content during a selection may include determining how long ago the user watched the content that was linked to in response to the selection. Operation 514 may comprise analyzing the selection for adjusting the prediction algorithm as discussed above in operation 504. Analyzing the selection improves the prediction algorithm's ability to accurately predict a user's preferences and increase the confidence in future predictions.

For example, a user may be watching the recap segment in the video data of season 2 episode 7 (e.g. S2E7). If the user decides to watch the full scene of a clip from S1E13, the prediction algorithm determines how long ago the user watched S1E13 based on the user profile and may store that information in a table in the user profile. The prediction algorithm may use that information to determine an average amount of time from when the user last watched an episode to when the user selected the option to view the full scene corresponding to a clip in a recap segment. Later, the prediction algorithm predicts that the full scene should be displayed instead of a clip. The prediction may be based, at least in part, on the amount of time which has passed since the user has watched the episode corresponding to the clip in the recap segment. After viewing the full scene, the viewer returns to the recap of the current episode (e.g. S2E7) and the next clip in the recap segment plays. If there are no more clips in the recap segment to play, the process ends.

Method 500 comprises decision block 516 which includes an operation to determine if there is another clip in the recap segment. If yes, method 500 loops back to operation 504 and iterates the process for each clip in the recap segment. If no, method 500 ends when there are no more clips left in the recap segment. Various embodiments of the methods disclosed herein predict whether to output certain content corresponding to a recap segment in order to enhance a user's viewing experience according to their preferences.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for locating content corresponding to a recap segment, the method comprising:
   determining whether a recap segment is present in video data corresponding to a video series;
   in response to determining that the recap segment is present, dividing the recap segment into clips corresponding to individual scenes in one or more previous episodes of the video series; and
   for each clip:
      comparing the clip to one or more of the episodes in the video series for determining a location of the clip in one of the episodes, wherein the comparing the clip to the one or more episodes includes analyzing speech-to-text data of the clip and the one or more episodes;
      determining whether the clip is part of a larger scene in the episode corresponding thereto;
      determining a starting and ending time of the larger scene within the episode; and
      storing the starting and ending time of the larger scene in correlation with the clip.

2. The computer-implemented method of claim 1, wherein the comparing the clip to the one or more episodes includes analyzing image data of the clip and the one or more episodes.

3. The computer-implemented method of claim 1, wherein the comparing the clip to the one or more episodes includes analyzing audio data of the clip and the one or more episodes.

4. The computer-implemented method of claim 1, wherein the clips are compared to episodes sequentially starting with a most recent episode.

5. A computer-implemented method, the method comprising:
   determining whether a recap segment is present in video data corresponding to a video series;
   in response to determining that the recap segment is present, identifying clips in the recap segment;
   outputting an option to alter output of one of the clips of the recap segment as the clip is output;
   in response to receiving selection of the option to alter the output of the clip, altering the clip according to the selection; and
   in response to not receiving selection of the option to alter the output of the clip, outputting the unaltered clip, wherein the option to alter the output of the clip of the recap segment as the clip is not output if the clip is tagged for preventing altering of the output of the clip.

6. The computer-implemented method of claim 5, wherein the clips in the recap segment correspond to individual scenes in the video series.

7. The computer-implemented method of claim 5, wherein the option to alter the output of the clip includes skipping the clip.

8. The computer-implemented method of claim 5, wherein the option to alter the output of the clip includes outputting at least a portion of a larger scene corresponding to the clip, the larger scene being from an episode of the video series.

9. The computer-implemented method of claim 5, comprising executing a prediction algorithm for determining whether to output the option for at least some of the clips.

10. The computer-implemented method of claim 9, wherein the prediction algorithm makes a prediction based on whether a user has rewound at least a portion of a previous episode.

11. The computer-implemented method of claim 9, wherein the prediction algorithm makes a prediction to alter the output of the clip based on passage of a threshold amount of time since a user has watched the previous episode corresponding to the clip.

12. A computer program product for altering output of a clip, the computer program product comprising a computer readable storage medium having program instructions embodied therewith, the program instructions executable by a computer to cause the computer to:
   determine, by the computer, whether a recap segment is present in video data corresponding to a video series;
   in response to determining that the recap segment is present, identify, by the computer, clips in the recap segment;
   output, by the computer, an option to alter output of one of the clips of the recap segment as the clip is output;
   in response to receiving selection of the option to alter the output of the clip, alter, by the computer, the clip according to the selection; and
   in response to not receiving selection of the option to alter the output of the clip, output, by the computer, the unaltered clip; and
   execute, by the computer, a prediction algorithm for determining whether to output the option to alter the output of the clip, wherein the prediction algorithm makes a prediction based on whether a user has rewound at least a portion of a previous episode.

13. The computer program product of claim 12, wherein the clips in the recap segment correspond to individual scenes in the video series.

14. The computer program product of claim 12, wherein the option to alter the output of the clip includes skipping the clip.

15. The computer program product of claim 12, wherein the option to alter the output of the clip includes outputting at least a portion of a larger scene corresponding to the clip, the larger scene being from an episode of the video series.

16. The computer program product of claim 12, wherein the prediction algorithm makes a prediction to alter the output of the clip based on passage of a threshold amount of time since a user has watched the previous episode corresponding to the clip.

* * * * *